(12) United States Patent
Yin et al.

(10) Patent No.: US 12,543,917 B2
(45) Date of Patent: Feb. 10, 2026

(54) CONTROL METHOD FOR WATER DIVERSION DEVICE, WATER DIVERSION DEVICE AND DISHWASHER

(71) Applicants: QINGDAO HAIER DISHWASHER CO. LTD, Shandong (CN); Haier Smart Home Co., Ltd., Shandong (CN)

(72) Inventors: Ningning Yin, Qingdao (CN); Yuling Chen, Qingdao (CN); Juan Liu, Qingdao (CN)

(73) Assignees: QINGDAO HAIER DISHWASHER CO. LTD, Qingdao (CN); Haier Smart Home Co. Ltd., Qingdao (CN)

( * ) Notice: Subject to any disclaimer, the term of this patent is extended or adjusted under 35 U.S.C. 154(b) by 293 days.

(21) Appl. No.: 18/546,993

(22) PCT Filed: Feb. 7, 2022

(86) PCT No.: PCT/CN2022/075391
§ 371 (c)(1),
(2) Date: Aug. 18, 2023

(87) PCT Pub. No.: WO2022/174740
PCT Pub. Date: Aug. 25, 2022

(65) Prior Publication Data
US 2024/0130600 A1 Apr. 25, 2024
US 2024/0225409 A9 Jul. 11, 2024

(30) Foreign Application Priority Data

Feb. 19, 2021 (CN) .................. 202110191874.X

(51) Int. Cl.
*A47L 15/42* (2006.01)
*A47L 15/00* (2006.01)
*A47L 15/22* (2006.01)

(52) U.S. Cl.
CPC ....... *A47L 15/4221* (2013.01); *A47L 15/0028* (2013.01); *A47L 15/22* (2013.01); *A47L 2401/07* (2013.01); *A47L 2501/03* (2013.01)

(58) Field of Classification Search
None
See application file for complete search history.

(56) References Cited

U.S. PATENT DOCUMENTS

2004/0173249 A1 9/2004 Assmann et al.

FOREIGN PATENT DOCUMENTS

| CN | 204542006 U | 8/2015 |
|---|---|---|
| CN | 110495828 A | 11/2019 |

(Continued)

OTHER PUBLICATIONS

Translation of CN209564102 by Ren, published Jan. 11, 2019.*

(Continued)

*Primary Examiner* — Kaj K Olsen
*Assistant Examiner* — Ryan L Coleman
(74) *Attorney, Agent, or Firm* — Maier & Maier, PLLC

(57) ABSTRACT

A control method for a water diversion device, a water diversion device and a dishwasher. The control method for a water diversion device includes: acquiring a target state position to be reached by a water diversion piece; acquiring the current state position of the water diversion piece; controlling a driving component to operate, and counting the number of signals actually received; on the basis of the target state position, the current state position and the number of signals actually received, determining whether the water diversion piece has reached the target state position; and when the water diversion piece has reached the target state position, controlling the driving component to stop rotating.

10 Claims, 3 Drawing Sheets

(56) References Cited

FOREIGN PATENT DOCUMENTS

| CN | 110495837 | A  | 11/2019 |
| CN | 110495841 | A  | 11/2019 |
| CN | 209564102 | U  | 11/2019 |
| CN | 111012275 | A  |  4/2020 |
| WO | 2018203129 | A1 | 11/2018 |

OTHER PUBLICATIONS

International Search Report mailed on Apr. 25, 2022, in corresponding International Application No. PCT/CN2022/075391, 5 pages.

* cited by examiner 41  411  412  42

CONTROL METHOD FOR WATER DIVERSION DEVICE, WATER DIVERSION DEVICE AND DISHWASHER

FIELD

The present disclosure belongs to the technical field of dishwashers, and specifically provides a control method for a water diversion device, a water diversion device, and a dishwasher.

BACKGROUND

Dishwashers on the market are typically provided with multiple spray arms. There are generally only two spray arms on a low-end dishwasher, i.e., a bottom spray arm and a top spray arm respectively, and there are three spray arms on a high-end dishwasher, i.e., a bottom spray arm, a middle spray arm and a top spray arm respectively.

In the prior art, in order to achieve water path switching between multiple spray arms, a water diversion device is usually required; that is, different on/off states of multiple spray arms are achieved through rotation of a water diversion plate in the water diversion device. In order to achieve the rotation of the water diversion plate, a gear set is usually arranged in the water diversion device, and the transmission of motion is achieved through gear meshing. That is, a driving gear drives a driven gear to rotate, and the driven gear drives the water diversion plate to rotate. However, for gear transmission, there can easily be transmission errors in actual control, which can cause failure of communication between the spray arms and the water diversion device, or cause incomplete communication therebetween, thereby affecting a washing effect of the dishwasher.

Accordingly, there is a need for a new control method for a water diversion device, a new water diversion device and a new dishwasher in the art to solve the problem of poor control accuracy of a rotation position of the water diversion plate in the water diversion device of existing dishwashers.

SUMMARY

In order to solve the above problem in the prior art, that is, to solve the problem of poor control accuracy of the rotation position of the water diversion plate in the water diversion device of existing dishwashers, the present disclosure provides a control method for a water diversion device, which includes: a driving component, on which a rotating shaft is arranged; a water diversion cover, on which water outlets are arranged; a water diversion plate, which is connected with the rotating shaft and provided with through holes, and which is communicated with different water outlets when the water diversion plate rotates to different state positions, so as to achieve switching of water path; and a position detection component, which is arranged to send signals in a process of switching the water diversion plate between two of the state positions; and the control method includes: obtaining a target state position to be reached by the water diversion plate; obtaining a current state position of the water diversion plate; controlling the driving component to work and counting the number of signals actually received; judging whether the water diversion plate has reached the target state position based on the target state position, the current state position, and the number of signals actually received; and controlling the driving component to stop rotating when the water diversion plate reaches the target state position.

In a preferred technical solution of the control method for the water diversion device described above, the signals include valid signals and invalid signals, and the step of "counting the number of signals actually received" further includes: respectively counting the numbers of the valid signals and the invalid signals received.

In a preferred technical solution of the control method for the water diversion device described above, the valid signals are high-level signals with a duration larger than a first preset time, and the invalid signals are low-level signals with a duration larger than a second preset time.

In a preferred technical solution of the control method for the water diversion device described above, the valid signals include an initial position valid signal and a conventional position valid signal; the initial position valid signal is a high-level signal with a duration larger than a third preset time, and the conventional position valid signal is a high-level signal with the duration larger than the first preset time, in which the third preset time is larger than the first preset time; and/or the first preset time is larger than the second preset time.

In a preferred technical solution of the control method for the water diversion device described above, the control method further includes: controlling the driving component to work; judging whether the initial position valid signal and the invalid signals have been received in sequence; and if yes, controlling the driving component to stop working.

In a preferred technical solution of the control method for the water diversion device described above, the step of "judging whether the water diversion plate has reached the target state position based on the target state position, the current state position, and the number of signals actually received" further includes: determining a target number of signals received based on the target state position and the current state position; and judging whether the water diversion plate has reached the target state position based on the number of signals actually received and the target number of signals received.

The present disclosure also provides a water diversion device, which includes: a driving component, on which a rotating shaft is arranged; a water diversion cover, on which water outlets are arranged; a water diversion plate, which is connected with the rotating shaft and provided with through holes, and which is communicated with different water outlets when the water diversion plate rotates to different state positions, so as to achieve switching of water path; and a position detection component, which is arranged to send signals in a process of switching the water diversion plate between two of the state positions.

In a preferred technical solution of the water diversion device described above, the water outlets include a first water outlet, a second water outlet and a third water outlet; circle centers of the three water outlets are located on a same dividing circle, and an included angle between the circle centers of adjacent two of the water outlets is 120°; the through holes include a first through hole, a second through hole, and a third through hole; circle centers of the first through hole, the second through hole and the third through hole are located on a same dividing circle; an included angle between the circle centers of the first through hole and the second through hole is 120°, and an included angle between the second through hole and the third through hole is 60°; and/or the position detection component includes a gear and a microswitch; the gear is connected with the rotating shaft, and gear teeth of the gear include a first gear tooth and multiple second gear teeth; a distance between the first gear tooth and the adjacent second gear tooth is larger than a distance between other adjacent gear teeth, and at each of the state positions, the corresponding gear teeth come into contact with the microswitch to trigger a signal; or the position detection component includes a light emitting device and a light receiving device; the light emitting device includes a shell and a light emitting source, the light emitting source is arranged on the rotating shaft, and the shell is connected with the rotating shaft and covers the light emitting source; the shell is provided with light transmission holes, and at each of the state positions, light emitted from the corresponding light transmission holes propagate to the light receiving device.

The present disclosure also provides a dishwasher, which includes a housing, a spray arm, and the water diversion device in the above technical solutions.

In a preferred technical solution of the dishwasher described above, the water diversion device is the water diversion device described in the above technical solutions, and the dishwasher further includes a spray arm seat, which is connected to the water diversion cover; the spray arm is rotatably connected to the spray arm seat, and the spray arm is provided with a first water flow channel and a second water flow channel; the first water outlet is communicated with the first water flow channel through the spray arm seat, and the second water outlet is communicated with the second water flow channel through the spray arm seat; the first water flow channel is provided with a forward-rotation guidance tilt port, and the second water flow channel is provided with a reverse-rotation guidance tilt port.

It can be understood by those skilled in the art that in the technical solutions of the present disclosure, the rotation of the rotating shaft of the driving component drives the water diversion plate to rotate, so that at each of the state positions, the water diversion plate is communicated with different water outlets to achieve switching of water path; the water diversion device further includes a position detection component, which can send signals during the process of switching between two state positions; in the present disclosure, the number of signals actually received is counted during the operation of the driving component, and it is judged whether the water diversion plate has reached the target state position based on the target state position, the current state position and the number of signals actually received, so that the driving component stops working after the position is reached, thus ensuring effective switching of water path. In other words, the position detection component can send signals during the process of switching between two state positions, so that by counting the number of signals, the position of the water diversion plate can be determined, and thus the position of the water diversion plate can be controlled.

In the present disclosure, the rotation of the water diversion plate is not driven through a transmission assembly; instead, the rotating shaft of the driving component is directly connected to the water diversion plate, thus avoiding transmission errors caused by gear transmission. Moreover, the position of the water diversion plate is controlled according to the number of signals, thus improving the control accuracy of the rotation position of the water diversion plate. In the control method for the water diversion device of the present disclosure, the rotation position of the water diversion plate can be indirectly reflected by the number of signals, so that precise control of each of the state positions of the water diversion plate can be achieved. Therefore, multi-position control of the communication between the water diversion cover with multiple water outlets and the water diversion plate can be achieved. For example, there are three water outlets on the water diversion cover, and for a communication mode in which there are at most two water outlets in communication with the water diversion plate, there can be six combinations of communication, and the control method of the present disclosure can accurately control the six state positions of the water diversion plate.

BRIEF DESCRIPTION OF DRAWINGS

The water diversion device and control method of the present disclosure will be described below with reference to the accompanying drawings. In the drawings.

DETAILED DESCRIPTION

Preferred embodiments of the present disclosure will be described below with reference to the accompanying drawings. It should be understood by those skilled in the art that these embodiments are only used to explain the technical principle of the present disclosure, and are not intended to limit the scope of protection of the present disclosure. Those skilled in the art can make adjustments to these embodiments as needed, so as to adapt to specific application scenes. For example, although the third preset time is larger than the first preset time in the description, it is obvious that the third preset time can be smaller than the first preset time in the description, as long as an initial position can be set for the purpose of distinguishing.

Figure 1:
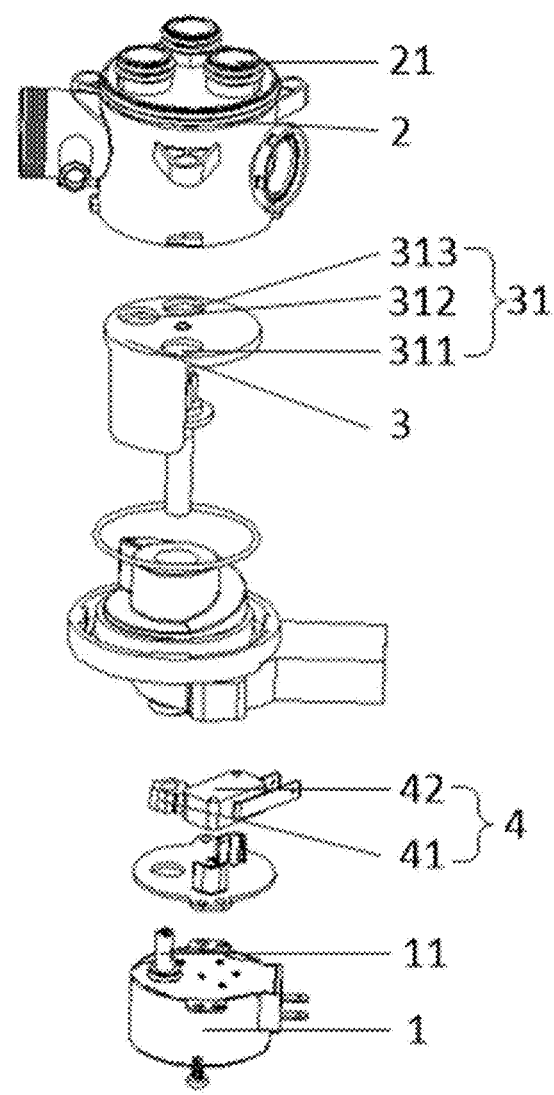
FIG. 1 is an exploded structural view of the water diversion device of the present disclosure.

As shown in FIG. 1, in order to solve the problem of poor control accuracy of the rotation position of the water diversion plate 3 in the water diversion device of existing dishwashers, the water diversion device of the present disclosure includes: a driving component 1, on which a rotating shaft 11 is arranged; a water diversion cover 2, on which water outlets 21 are arranged; a water diversion plate 3, which is connected with the rotating shaft 11 and provided with through holes 31, and which is communicated with different water outlets 21 when the water diversion plate 3 rotates to different state positions, so as to achieve switching of water path; and a position detection component 4, which is arranged to send signals in a process of switching the water diversion plate 3 between two of the state positions. In a possible embodiment, the driving component 1 is a motor; specifically, it can be a DC motor or an AC motor, with at least one pole controllable to ensure that the motor can be powered on and off normally.

Figure 2:
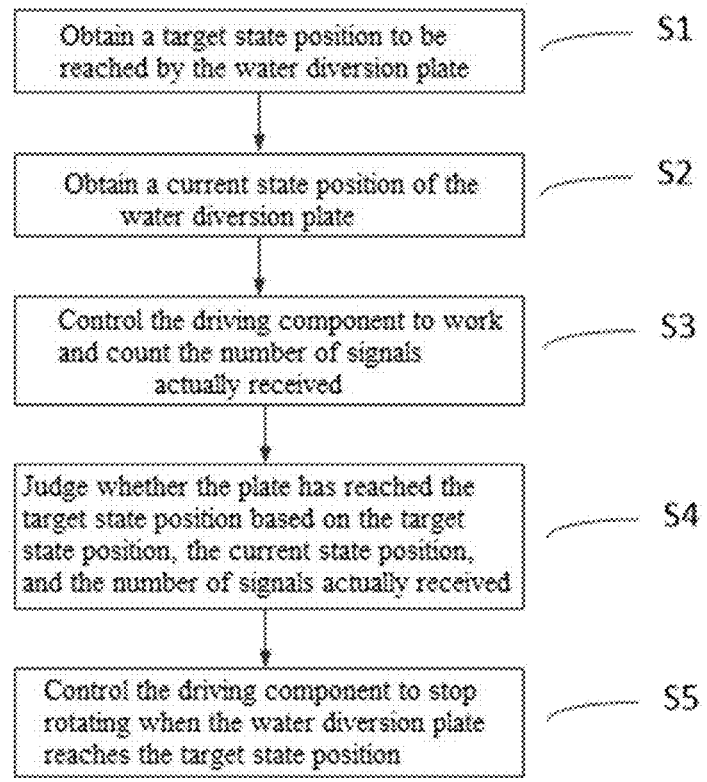
FIG. 2 is a flowchart showing steps of the control method for the water diversion device of the present disclosure.

As shown in FIG. 2 and with reference to FIG. 1, the control method for the water diversion device of the present disclosure includes the following steps S1-S5.

Step S1: obtaining a target state position to be reached by the water diversion plate 3.

During the operation of the dishwasher, in order to achieve a good washing effect, the water diversion plate 3 will switch to different target state positions throughout the washing process to achieve switching of different water paths. Therefore, the control method for the water diversion device of the present disclosure first needs to determine the target state position to be reached, so as to realize precise control of the position.

Step S2: obtaining a current state position of the water diversion plate 3.

The current state position of the water diversion plate 3 includes a state position at which the water diversion plate 3 finally stopped when it last rotated, or a state position when it was powered on.

Step S3: controlling the driving component 1 to work and counting the number of signals actually received.

The above signals may take various forms, such as electrical signals, optical signals, or acoustic signals. In a preferred embodiment, the signals actually received are electrical signals, which include valid signals and invalid signals, that is, the numbers of received valid signals and invalid signals are counted respectively. Further, the valid signals are high-level signals with a continuous detection time larger than a first preset time, and the invalid signals are low-level signals with a continuous detection time larger than a second preset time. The first preset time is larger than the second preset time. For example, the first preset time is 300 ms, and the second preset time is 10 ms. Further, the valid signals include an initial position valid signal and a conventional position valid signal. The initial position valid signal is a high-level signal with a continuous detection time larger than a third preset time, and the conventional position valid signal is a high-level signal with a continuous detection time larger than the first preset time. The third preset time is larger than the first preset time. For example, the third preset time is 1000 ms, and the first preset time is 300 ms.

In order to prevent interference, the present disclosure limits the continuous detection time of the high-level signals, and only when the continuous detection time is larger than the first preset time will the high-level signals be denoted as valid signals, that is, the counting of the number of valid signals begins; similarly, only when the continuous detection time is larger than the second preset time will the low-level signals be denoted as invalid signals. By extending the continuous detection time of the low-level signals, the continuous detection time of the low-level signals is made larger than the duration of a certain electromagnetic interference, which can effectively prevent misjudgment caused by electromagnetic interference during signal transmission, and avoid reduction in control accuracy. For example, low-level signals that were misjudged due to electromagnetic interference appear in the high-level signal segment. In the present application, high level means that the high-level signal has been continuously detected for more than 10 ms. In a preferred embodiment, only when the continuous detection time is larger than the first preset time (such as 300 ms) will the high-level signals be denoted as valid signals.

Step S4: judging whether the water diversion plate 3 has reached the target state position based on the target state position, the current state position, and the number of signals actually received.

Step S5: controlling the driving component 1 to stop rotating when the water diversion plate 3 reaches the target state position.

Figure 3:
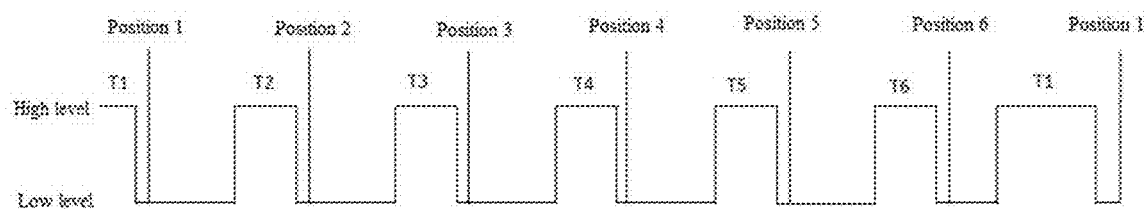
FIG. 3 is a schematic diagram showing signal distribution of the control method for the water diversion device of the present disclosure.

By judging the target state position and the current state position, and based on the number of signals actually received, it can be analyzed whether the water diversion plate 3 has reached the target state position. In a preferred embodiment, a target number of signals received can be first determined based on the target state position and the current state position; then, based on the number of signals actually received and the target number of signals received, it can be judged whether the water diversion plate 3 has reached the target state position. For example, as shown in FIG. 3, if the current state position is position 1 and the target state position is position 4, it is necessary to continuously detect three high-level valid signals of T2, T3 and T4, and three low-level invalid signals. When the continuous detection time of the last low-level signal is more than 10 ms, the low-level signal is denoted as an invalid signal. When a low-level invalid signal with the continuous detection time being more than 10 ms is finally detected, the driving component 1 is controlled to stop working; at this point, position 4 is reached, and position 4 is used as an initial position for the next rotation of the water diversion plate 3. If rotation to position 2 is desired next time, then when four high-level valid signals of T5, T6, T1 and T2 and four low-level invalid signals are detected, the driving component 1 is controlled to stop working.

In a possible embodiment, the numbers of valid signals and invalid signals Nx, x=a, b, c, . . . , at each state position can be set by taking the initial position as a reference, where Nx=1, . . . , m. If the number of signals at the current state position is Na, and the number of signals at the target state position is Nb, the target number of signals received is determined to be Nb−Na when Na<Nb, and the target number of signals received is determined to be m−Na+Nb when Na>Nb. For example, the numbers of valid signals and invalid signals at position 2 are each set to 1, the numbers of valid signals and invalid signals at position 3 are each set to 2, and so on. In this way, the numbers of valid signals and invalid signals at the target state position and the current state position can be obtained. For example, if the numbers of valid signals and invalid signals at the current state position are 2 respectively (i.e., position 3), and the numbers of valid signals and invalid signals at the target state position are 4 respectively (i.e., position 5), then from position 3 to position 5, there are two valid signals and two invalid signals to go through. For another example, there are a total of six state positions, so m=6. If the numbers of valid signals and invalid signals at the current state position are 4 respectively (i.e., position 5), and the numbers of valid signals and invalid signals at the target state position are 1 respectively (i.e., position 2), then from position 5 to position 2, there are 6−4+1=3 (three) valid signals and invalid signals to go through.

The above arrangement has the following advantages: the rotating shaft 11 of the driving component 1 of the present disclosure is directly connected to the water diversion plate 3, thus avoiding transmission errors caused by gear transmission. Moreover, the state position of the water diversion plate 3 is indirectly reflected by the number of signals, so that precise control of multiple state positions of the water diversion plate 3 can be achieved, thereby ensuring the washing effect of the dishwasher.

In a preferred embodiment, the control method of the present disclosure further includes: controlling the driving component 1 to work; judging whether the initial position valid signal and the invalid signals have been received in sequence; and if yes, controlling the driving component 1 to stop working.

When the water diversion device works, the water diversion plate 3 first reaches the initial position, and the initial position is used as a reference point. For example, each time the dishwasher is powered on or off, the position of the water diversion plate 3 is adjusted so that it returns to the initial position. Alternatively, when the water diversion device initially works, the position of the water diversion plate 3 is adjusted so that it returns to the initial position, that is, a "zeroing" operation is performed, which is advantageous for counting the numbers of valid signals and invalid signals. The water diversion device is reset when it initially works, and each time it is powered on subsequently, the last final working position can be used as the base point.

With continued reference to FIG. 1, the present disclosure also provides a water diversion device, which is the water diversion device described in the above technical solutions. In a preferred embodiment, the water outlets 21 include a first water outlet, a second water outlet and a third water outlet; circle centers of the three water outlets 21 are located on a same dividing circle, and an included angle between the circle centers of adjacent two of the water outlets 21 is 120°; the through holes 31 include a first through hole 311, a second through hole 312, and a third through hole 313; circle centers of the first through hole 311, the second through hole 312 and the third through hole 313 are located on a same dividing circle; an included angle between the circle centers of the first through hole 311 and the second through hole 312 is 120°, and an included angle between the second through hole 312 and the third through hole 313 is 60°.

The above arrangement has the following advantages: it can achieve water path control of six state positions, namely: the first water outlet is communicated, and the second water outlet and the third water outlet are closed; the second water outlet is communicated, and the first water outlet and the third water outlet are closed; the third water outlet is communicated, and the first water outlet and the second water outlet are closed; the first water outlet is closed, and the second water outlet and the third water outlet are opened; the second water outlet is closed, and the first water outlet and the third water outlet are opened; the third water outlet is closed, and the first water outlet and the second water outlet are opened. It can achieve switching of six different water paths, achieve good washing effect, and solve the pain point of users complaining that the dishwasher cannot achieve clean washing. In addition, the shape of the through holes 31 and the shape of the water outlets 21 of the present disclosure may take various forms, such as circular, elliptical, or irregular holes, so as to facilitate conducting corresponding design according to actual application scenes, making the application range wider. In a possible embodiment, the shape of the through holes 31 is the same as that of the water outlets 21.

Figure 4:
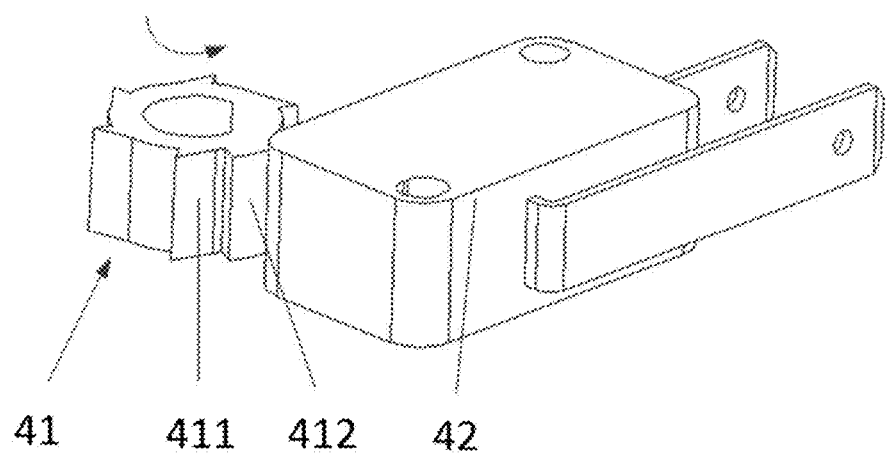
FIG. 4 is a schematic structural diagram of a first embodiment of a position detection component of the water diversion device of the present disclosure.

As shown in FIG. 4 and with continued reference to FIG. 1, in a first possible embodiment, the position detection component 4 includes a gear 41 and a microswitch 42; the gear 41 is connected with the rotating shaft 11, and gear teeth of the gear 41 include a first gear tooth 411 and multiple second gear teeth 412; a distance between the first gear tooth 411 and the adjacent second gear tooth 412 is smaller than a distance between other adjacent gear teeth, and at each of the state positions, the corresponding gear teeth come into contact with the microswitch 42 to trigger a signal. It can be understood that the above adjacent second gear tooth 412 to the first gear tooth 411 is an adjacent gear tooth with the same rotation direction as the gear 41. The above arrangement can minimize the contact time between the first gear tooth 411 and the microswitch 42, thus serving as the base point for determining the initial position.

In an alternative embodiment, the distance between the first gear tooth 411 and the adjacent second gear tooth 412 is larger than the distance between other adjacent gear teeth. This alternative embodiment corresponds to the above control method for the water diversion device. This arrangement has the following advantages: by setting the maximum distance between the first gear tooth and adjacent gear tooth, the first gear tooth can be in contact with the microswitch 42 for the longest time, so that the triggered valid signal has the longest duration. Therefore, it can be used as the base point for the initial position, facilitating counting the number of signals.

Figure 5:
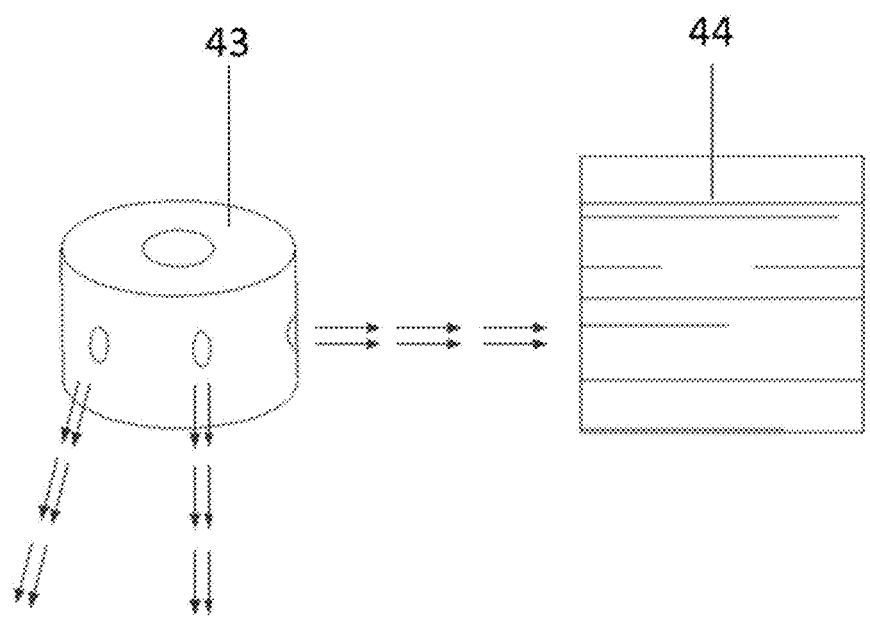
FIG. 5 is a schematic structural diagram of a second embodiment of the position detection component of the water diversion device of the present disclosure.

As shown in FIG. 5, in a second possible embodiment, the position detection component 4 includes a light emitting device 43 and a light receiving device 44; the light emitting device 43 includes a shell and a light emitting source, the light emitting source is arranged on the rotating shaft 11, and the shell is connected with the rotating shaft 11 and covers the light emitting source; the shell is provided with light transmission holes, and at each of the state positions, light emitted from the corresponding light transmission hole propagates to the light receiving device 44.

The light coming from the light emitting source can be emitted outward through the light transmission holes on the shell, and as the rotating shaft 11 rotates, at each of the state positions, the light receiving device 44 can receive the optical signals emitted from the corresponding light transmission holes. Therefore, based on the number of optical signals actually received, and by determining the position of the water diversion plate 3 based on the target state position and the current state position, precise control of the position can be achieved.

The present disclosure also provides a dishwasher (not shown), which includes a housing, a spray arm, and the water diversion device in the above technical solutions. In a preferred embodiment, the dishwasher further includes a spray arm seat, which is connected to the water diversion cover 2; the spray arm is rotatably connected to the spray arm seat, and the spray arm is provided with a first water flow channel and a second water flow channel; the first water outlet is communicated with the first water flow channel through the spray arm seat, and the second water outlet is communicated with the second water flow channel through the spray arm seat; the first water flow channel is provided with a forward-rotation guidance tilt port, and the second water flow channel is provided with a reverse-rotation guidance tilt port.

In the present disclosure, the first water outlet is communicated with the first water flow channel of the spray arm, the second water outlet is communicated with the second water flow channel of the spray arm, and the forward-rotation guidance tilt port and reverse-rotation guidance tilt port are arranged, so that forward rotation and reverse rotation of the spray arm can be achieved. In a possible embodiment, the above spray arm is a bottom spray arm, which can better wash the tableware and achieve a better cleaning effect. Further, the third water outlet is communicated with a middle spray arm and a top spray arm of the dishwasher at the same time, and forward-rotation guidance tilt ports or reverse-rotation guidance tilt ports are arranged according to actual needs. Therefore, by controlling the communication state of the water outlets 21, multiple spraying modes are achieved for the three spray arms, thus improving the cleaning rate of the dishwasher. For example, in state position 1, the bottom spray arm is in forward rotation; in state position 2, the bottom spray arm is in reverse rotation, and the middle spray arm and the top spray arm are in forward rotation; in state position 3, the bottom spray arm is in reverse rotation; in state position 4, the bottom spray arm, the middle spray arm and the top spray arm are in forward rotation; and in state position 5, the middle spray arm and the top spray arm are in forward rotation. The tableware can be flexibly sprayed and cleaned by switching between several state positions.

In summary, the control method for the water diversion device of the present disclosure can accurately control the position for the switching of multiple water paths of the water diversion plate 3 by determining the numbers of valid signals and invalid signals. By extending the continuous detection time of high-level and low-level signals, it can effectively prevent misjudgment caused by interference. By setting the longest or shortest distance between certain two gear teeth of the gear 41, the initial position can be determined, facilitating counting the number of signals.

It should be noted that the above embodiments are only used to illustrate the principles of the present disclosure, and are not intended to limit the scope of protection of the present disclosure. Without deviating from the principles of the present disclosure, those skilled in the art can adjust the above structures so that the present disclosure can be applied in more specific application scenes.

For example, in an alternative embodiment, the valid signals may be low-level signals with a continuous detection time larger than the third preset time, and the invalid signals may be high-level signals with a continuous detection time larger than a fourth preset time, all of which do not deviate from the principles of the present disclosure and therefore fall within the scope of protection of the present disclosure.

For example, in another alternative embodiment, the third preset time may be smaller than the first preset time. For example, the continuous detection time of the initial position valid signal is 300 ms, and the continuous detection time of the conventional position valid signal is 1000 ms, as long as the initial position and the conventional position can be distinguished. These changes do not deviate from the principles of the present disclosure, and therefore will all fall within the scope of protection of the present disclosure.

For example, in another alternative embodiment, the position detection component 4 includes a light source transmitter and a light source receiver. The light source transmitter is located on the light source receiver, and a reflector is provided on the rotating shaft 11. At each of the state positions, the light emitted from the light source transmitter is reflected onto the light source receiver through the corresponding reflector and will be counted as one signal, as long as signals can be sent in the process of switching the water diversion plate 3 between two state positions. These changes do not deviate from the principles of the present disclosure, and therefore will all fall within the scope of protection of the present disclosure.

Finally, it should be noted that although the present disclosure is described by taking the dishwasher as an example, the water diversion device of the present disclosure can obviously be applied to other devices used for water path switching. For example, the water diversion device can also be applied in a water supply system and the like.

It can be understood by those skilled in the art that the dishwasher described above also includes some other well-known structures, such as a processor, a controller, a memory, etc. The memory includes but is not limited to random access memory, flash memory, read-only memory, programmable read-only memory, volatile memory, non-volatile memory, serial memory, parallel memory or register, etc. The processor includes but is not limited to CPLD/FPGA, DSP, ARM processor, MIPS processor, etc. In order not to unnecessarily obscure the embodiments of the present disclosure, these well-known structures are not shown in the drawings.

In the above embodiments, although the steps have been described in the order described above, it can be understood by those skilled in the art that in order to achieve the effects of the embodiments, different steps do not necessarily need to be executed in this order. They can be executed simultaneously (in parallel) or in a reverse order. For example, the current state position of the water diversion plate is obtained first, and then the target state position to be reached by the water diversion plate is obtained. These simple changes are all within the scope of protection of the present disclosure.

Hitherto, the technical solutions of the present disclosure have been described in connection with the preferred embodiments shown in the accompanying drawings, but it is easily understood by those skilled in the art that the scope of protection of the present disclosure is obviously not limited to these specific embodiments. Without departing from the principles of the present disclosure, those skilled in the art can make equivalent changes or replacements to relevant technical features, and all the technical solutions after these changes or replacements will fall within the scope of protection of the present disclosure.

What is claimed is:

1. A control method for a water diversion device, wherein: the water diversion device comprises:
    a driving component on which a rotating shaft is arranged;
    a water diversion cover on which water outlets are arranged;
    a water diversion plate which is connected with the rotating shaft and provided with through holes, and which is communicated with different water outlets when the water diversion plate rotates to different state positions, so as to achieve switching of water path; and
    a position detection component which is arranged to send signals in a process of switching the water diversion plate between two of the state positions;
    the water outlets comprise a first circular water outlet comprising a first circle center at a center of the first circular water outlet, a second circular water outlet comprising a second circle center at a center of the second circular water outlet, and a third circular water outlet comprising a third circle center at a center of the third circular water outlet;
    the circle centers of the three water outlets are located on a first dividing circle, wherein a first imaginary radial line extends from the center of the first dividing circle to the circle center of the first circular water outlet, wherein a second imaginary radial line extends from the center of the first dividing circle to the circle center of the second circular water outlet, wherein a third imaginary radial line extends from the center of the first dividing circle to the circle center of the third circular water outlet, and wherein each pair of the first, second, and third imaginary radial lines form a 120° angle;
    the through holes comprise a first circular through hole comprising a fourth circle center at a center of the first circular through hole, a second circular through hole comprising a fifth circle center at a center of the second circular through hole, and a third circular through hole comprising a sixth circle center at a center of the third circular through hole;

the circle centers of the first circular through hole, the second circular through hole, and the third circular through hole are located on a second dividing circle, wherein a fourth imaginary radial line extends from the center of the second dividing circle to the circle center of the first circular through hole, wherein a fifth imaginary radial line extends from the center of the second dividing circle to the circle center of the second circular through hole, and wherein a sixth imaginary radial line extends from the center of the second dividing circle to the circle center of the third circular through hole;

an angle between the fourth imaginary radial line and the fifth imaginary radial line is 120°, and an angle between the fifth imaginary radial line and the sixth imaginary radial line is 60°; and the control method comprises:
  obtaining a target state position to be reached by the water diversion plate;
  obtaining a current state position of the water diversion plate;
  controlling the driving component to rotate the water diversion plate and counting a number of the signals;
  judging whether the water diversion plate has reached the target state position based on the target state position, the current state position, and the number of the signals; and
  controlling the driving component to stop rotating the water diversion plate when the water diversion plate reaches the target state position.

2. The control method for the water diversion device according to claim 1, wherein the signals comprise valid signals and invalid signals, and the step of counting the number of the signals further comprises:
  respectively counting the number of the valid signals and the number of invalid signals.

3. The control method for the water diversion device acceding to claim 2, wherein the valid signals are signals with a duration larger than a first preset time, and the invalid signals are signals with a duration larger than a second preset time.

4. The control method for the water diversion device according to claim 3, wherein:
  the valid signals comprise an initial position valid signal and a conventional position valid signal; and
  the initial position valid signal is a signal with a duration larger than a third preset time, and the conventional position valid signal is a signal with a duration larger than the first preset time, wherein the third preset time is larger than the first preset time, and/or the first preset time is larger than the second preset time.

5. The control method for the water diversion device according to claim 1, wherein the step of judging whether the water diversion plate has reached the target state positioned based on the target state position, the current state position, and the number of the signals further comprises:
  determining a target number of signals received based on the target state position and the current state position; and
  judging whether the water diversion plate has reached the target state position based on a number of signals received and the target number of signals received.

6. A water diversion device, comprising:
a driving component on which a rotating shaft is arranged;
a water diversion cover on which water outlets are arranged;
a water diversion plate which is connected with the rotating shaft and provided with through holes, and which is communicated with different water outlets when the water diversion plate rotates to different state positions, so as to achieve switching of water path; and
a position detection component with is arranged to send signals in a process of switching the water diversion plate between two of the state positions;

wherein the water outlets comprise a first circular water outlet comprising a first circle center at a center of the first circular water outlet, a second circular water outlet comprising a second circle center at a center of the second circular water outlet, and a third circular water outlet comprising a third circle center at a center of the third circular water outlet;

wherein the circle centers of the three water outlets are located on a first dividing circle, wherein a first imaginary radial line extends from the center of the first dividing circle to the circle center of the first circular water outlet, wherein a second imaginary radial line extends from the center of the first dividing circle to the circle center of the second circular water outlet, wherein a third imaginary radial line extends from the center of the first dividing circle to the circle center of the third circular water outlet, and wherein each pair of the first, second, and third imaginary radial lines form a 120° angle;

wherein the through holes comprise a first circular through hole comprising a fourth circle center at a center of the first circular through hole, a second circular through hole comprising a fifth circle center at a center of the second circular through hole, and a third circular through hole comprising a sixth circle center at a center of the third circular through hole;

wherein the circle centers of the first circular through hole, the second circular through hole, and the third circular through hole are located on a second dividing circle, wherein a fourth imaginary radial line extends from the center of the second dividing circle to the circle center of the first circular through hole, wherein a fifth imaginary radial line extends from the center of the second dividing circle to the circle center of the second circular through hole, and wherein a sixth imaginary radial line extends from the center of the second dividing circle to the circle center of the third circular through hole;

wherein an angle between the fourth imaginary radial line and the fifth imaginary radial line is 120°, and an angle between the fifth imaginary radial line and the sixth imaginary radial line is 60°.

7. The water diversion device according to claim 6, wherein:
the position detection component comprises a gear and a microswitch; the gear is connected with the rotating shaft, and gear teeth of the gear comprise a first gear tooth and multiple second gear teeth; a distance between the first gear tooth and an adjacent second gear tooth is larger than a distance between other adjacent gear teeth, and at each of the state positions, a corresponding gear tooth comes into contact with the microswitch to trigger a signal; or the position detection component comprises a light emitting device and a light receiving device; the light emitting device comprises a shell and a light emitting source, the light emitting source is arranged on the rotating shaft, and the shell is connected with the rotating shaft and covers the light emitting source; the shell is provided with light transmission holes, and at each of the state positions, light emitted from a corresponding light transmission hole propagates to the light receiving device.

8. A dishwasher, comprising a housing, a spray arm, and the water diversion device according to claim 7.

9. The dishwasher according to claim 8, further comprising:
- a spray arm seat, which is connected to the water diversion cover;
- wherein the spray arm is rotatably connected to the spray arm seat, and the spray arm is provided with a first water flow channel and a second water flow channel;
- wherein the first circular water outlet is communicated with the first water flow channel through the spray arm seat, and the second circular water outlet is communicated with the second water flow channel through the spray arm seat; and
- wherein the first water flow channel is provided with a forward-rotation guidance tilt port, and the second water flow channel is provided with a reverse-rotation guidance tilt port.

10. A dishwasher, comprising a housing, a spray arm, and the water diversion device according to claim 6.

* * * * *